United States Patent [19]

Bond

[11] Patent Number: 4,571,458

[45] Date of Patent: Feb. 18, 1986

[54] TELEPHONE ANSWERING SYSTEM WITH ADDITIONAL MESSAGE STORAGE CAPABILITIES

[75] Inventor: Raymond G. Bond, Long Beach, Calif.

[73] Assignee: T.A.D. Avanti, Inc., Compton, Calif.

[21] Appl. No.: 546,980

[22] Filed: Oct. 31, 1983

[51] Int. Cl.⁴ .............................................. H04M 1/65
[52] U.S. Cl. ................................................. 179/6.11
[58] Field of Search ..................... 179/6.03, 6.06, 6.07, 179/6.08, 6.10, 6.11

[56] References Cited

U.S. PATENT DOCUMENTS

| | | | |
|---|---|---|---|
| 4,122,306 | 10/1978 | Friedman et al. | 179/6.06 |
| 4,194,089 | 3/1980 | Hashimoto | 179/6.08 |
| 4,327,251 | 4/1982 | Fomenko et al. | 179/6.11 |

FOREIGN PATENT DOCUMENTS 1525437 9/1978 United Kingdom ............... 179/6.03

Primary Examiner—Donald McElheny, Jr.
Attorney, Agent, or Firm—Keith D. Beecher

[57] ABSTRACT

A telephone answering system which includes an announcement tape (T-1) on which an announcement is recorded to be transmitted over the telephone line to a calling party upon the receipt of an incoming telephone call, and which also includes a message tape (T-2) on which a message from the calling party may be recorded. The telephone answering system has the capability of storing one or more messages on the announcement tape (T-1) in addition to the announcement, which are intended to be forwarded to one or more persons. The additional messages may be recorded from a remote location at preselected positions on the announcement tape (T-1) when a person transmits the proper access code over the telephone line, and then records one or more messages at one or more positions on the announcement tape. Each of the various persons to whom the different messages are to be forwarded may recover his particular message from a remote location over the telephone line. Each of the persons is provided with a particular code which when sent over the telephone line accesses to the corresponding position on the announcement tape (T-1) to cause the message at that particular position to be transmitted to the caller over the telephone line.

9 Claims, 1 Drawing Figure

TELEPHONE ANSWERING SYSTEM WITH ADDITIONAL MESSAGE STORAGE CAPABILITIES

BACKGROUND OF THE INVENTION

The system of the invention may be incorporated into a telephone answering system of the type described, for example, in Copending Application Ser. No. 523,115, which was filed Aug. 15, 1983, and which is assigned to the present assignee. The telephone answering system described in the Copending Application includes a magnetic tape (T-1) on which an announcement is recorded, and which is activated during an announcement interval ($T_1$) in response to a telephone call, and which causes the announcement to be transmitted over the telephone line to the calling party during that interval. At the end of the announcement interval ($T_1$) a magnetic tape ($T_2$) is activated, and the message received over the telephone line from the calling party during the ensuing time interval ($T_2$) is recorded on that tape.

Remote control of the telephone answering system described in the Copending Application is achieved by means of a small portable transmitter which is held up to the mouthpiece of a telephone by the calling party, or by the calling party operating selected pushbuttons of the "Touch Tone" type telephone, so that a remote control tone signal of a particular frequency may be transmitted over the telephone line. The telephone answering system of the Copending Application is designed to respond to a tone signal of a particular frequency to activate a remote control circuit. This remote control circuit causes the message tape (T-2) to be rewound and then set to a playback condition so that the messages recorded on the message tape may be successively transmitted over the telephone line to the calling party.

In the system of the Copending Application, the remote control tone signal may be transmitted over the telephone line to the telephone answering system, either during the announcement interval ($T_1$) or during the message recording interval ($T_2$). Upon the receipt of the proper remote control tone signal, a microcomputer causes the system to transmit a series of beep tones over the telephone line to the calling party. Should the calling party again send the remote control tone signal over the telephone line at that time, a new announcement may be recorded on the announcement tape (T-1). Upon the receipt of the remote control tone signal the announcement tape is rewound to its beginning position, at which time the microcomputer causes a continuous tone to be transmitted over the telephone line to the calling party indicating that the system is now ready to receive the new announcement. The calling party then transmits the new announcement over the telephone line, and the new announcement is recorded on the announcement tape (T-1). The calling party then transmits the remote control tone signal once more, which causes the microcomputer to stop the announcement tape (T-1), and to cause a beep tone to be recorded on the announcement tape, indicating the end of the announcement.

The system of the present invention has an additional feature in that when remote control signals are transmitted over the telephone line to the telephone answering system in a particular code, the announcement tape (T-1) is moved to a selected position at which a first message may be recorded, at which time the microcomputer causes a continuous tone to be transmitted to the calling party over the telephone line indicating that the system is now ready to receive the message. The calling party then sends the message over the telephone line, and the message is recorded at the selected position on the announcement tape (T-1). The calling party then transmits the selected code again over the telephone line, which causes the microcomputer to stop the announcement tape (T-1), and which causes a beep tone to be recorded on the tape indicating the end of the message.

By using different codes, the calling party may record different messages at different locations on the announcement tape (T-1) which may, for example, be forwarded to different persons. These different persons are each provided with a different code, and they may obtain their messages from their respective remote locations by sending their codes over the telephone line and thereby obtaining access to the particular locations on the announcement tape (T-1) at which their particular messages are recorded.

The tones may be sent over the telephone line first to obtain access for recording the different messages, and then to obtain access for receiving the different messages, by utilizing different pushbuttons of a "Touch Tone" telephone, or by using a transmitter unit equipped with a "Touch Tone" keyboard.

DETAILED DESCRIPTION OF THE ILLUSTRATED EMBODIMENT

Figure 1:
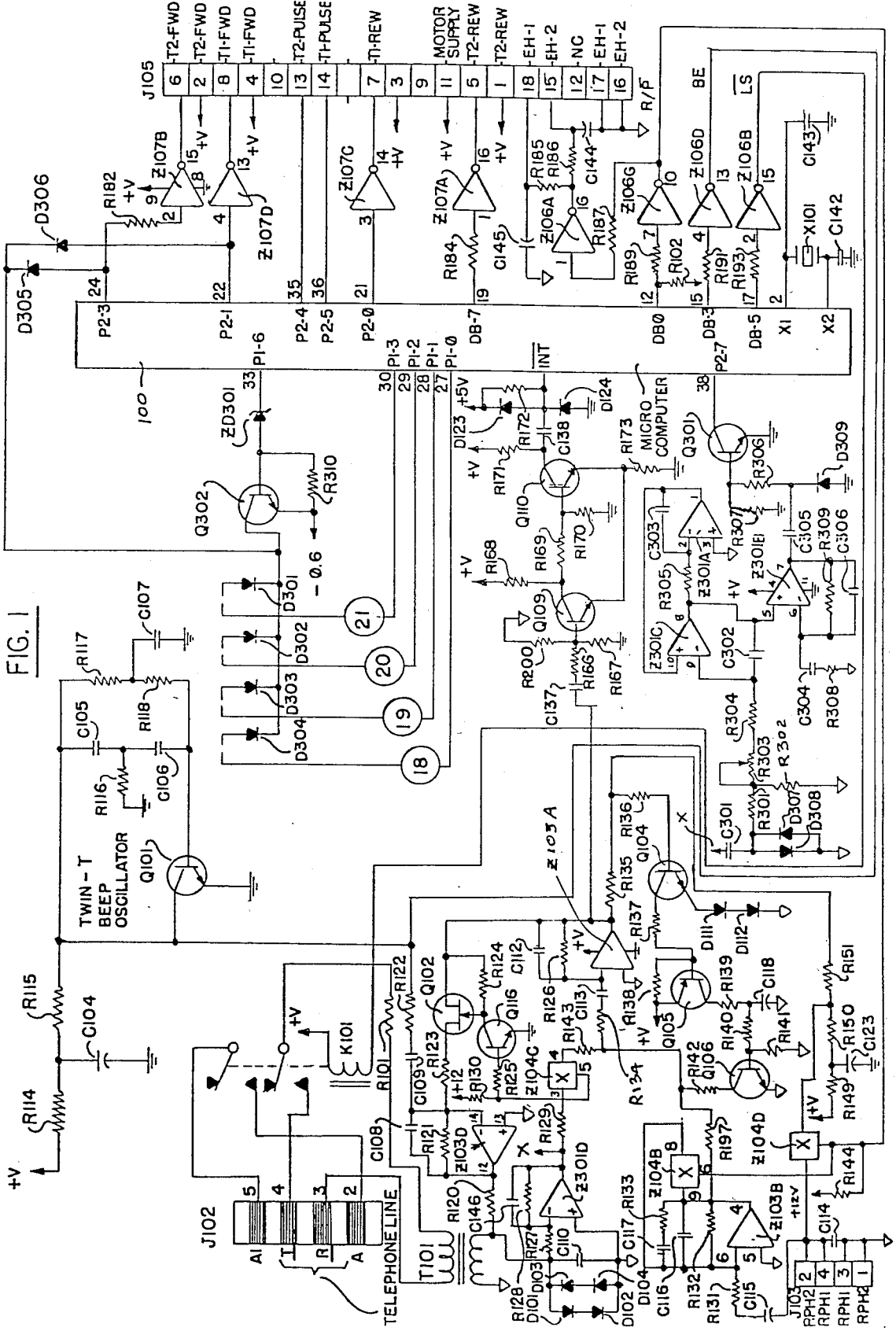
FIG. 1 is a schematic circuit diagram of a telephone answering system incorporating the concepts of the present invention.

The telephone answering system shown in FIG. 1 includes a microcomputer 100 which may be of the type manufactured and sold by National Semiconductor Company, and designated by them as INS8049. The telephone answering system includes a terminal strip J102 which has terminals 3 and 4 connected to the tip and ring terminals of the telephone line. Line seizure is effectuated through a relay K101. The telephone answering system is coupled to the telephone line through a transformer T101.

The outgoing audio signals are amplified by an amplifier Z103D, and the incoming audio signals are amplified by an amplifier Z301D. A terminal board J103 is connected to the record/reproduce head RPH2 associated with the messsage tape (T-2), and to the record/reproduce head RPH1 associated with the announcement tape (T-1). The system also includes a twin-T beep oscillator circuit of transistor Q101.

The incoming audio signals from transformer T101, after amplification by amplifier Z301D, are passed through a bilateral analog switch Z104C to a further amplifier Z103A, and through a bilateral analog switch Z104D to the record/reproduce head RPH2 to be recorded on the message tape (T-2), and to record/reproduce head RPH1 to be recorded on the announcement tape (T-1). Resistors R149 and R150, together with a grounded capacitor C123 provide a bias circuit for the heads. An automatic gain control for amplifier Z103A is provided by transistors Q104, Q105 and Q106.

When the message retrieval remote control tone signal is received during the $T_2$ time interval, it is fed to amplifier Z301D by way of resistor R127 and transformer T101. Amplifier Z301D feeds the signal to bilateral analog switch Z104C, and from there to the audio system of amplifier Z103A. The remote tone signal is also fed to the narrow bandpass filter consisting of amplifiers Z301C, Z301A and Z301B. The frequency response of the bandpass filter is adjusted by potentiometer R303. The output of the bandpass filter is fed to port P2-7 of the microcomputer by way of capacitor C305, resistor R306 and transistor Q301.

Once the message retrieval remote control signal is recognized by the microcomputer 100, the microcomputer sets port P2-3 low (0), causing the $T_2$ tape to stop. The system is then placed in its transmit mode by the microcomputer setting port DB-0 (0). The microcomputer now sets port DB-3 alternately high (1) and low (0), alternately turning the twin-T beep oscillator of transistor Q101 on and off, to cause a series of beep tones to be transmitted to the calling party over the telephone line.

When a message is to be recorded on the announcement tape (T-1) by remote operation, the message retrieval remote tone signal is again transmitted over the telephone line during the occurrence of the series of beeps, and is received and fed into the system through transformer T101 and through amplifier Z301D to the narrow bandpass filter Z301C, Z301A and Z301B, and through transistor Q301 to port P2-7 of the microcomputer. This causes the microcomputer to signal the system to enter the T-1 announcement record mode. The microcomputer then activates the T-1 rewind solenoid by making port P2-0 high (1). This causes the announcement tape (T-1) to rewind producing pulses at port P2-5. The announcement tape continues to rewind until the pulses stop.

When pulses are no longer received at the port P2-5, the indication is that the announcement tape (T-1) has arrived at a predetermined position, and the microcomputer then sets port DB-3 low (0) causing the oscillator of transistor Q101 to transmit a steady beep tone, which is sent over the telephone line. This tone continues for approximately 1 second. Once the beep tone commences, and the T-1 rewind stops, port P2-0 is made low (0) and port P2-1 is made high (1), activating the forward control of the announcement tape (T-1).

When a calling party hears the steady beep tone, he can start the message to be recorded on the announcement tape (T-1), and the resulting audio signals from the telephone line are fed through transformer T101, amplifier Z301D, switch Z104C to amplifier Z103A. The output from Z103A is fed to resistor R136 so that the AGC circuit of transistors Q104, Q105 and Q106 are able to keep a constant amplitude level. The output from Z103A is fed by way of level setting resistor R151 to the bias circuit R150, R149 and C123, and through switch Z104D to the T-1 record head (RPH1). In this manner, the message is recorded on the announcement tape (T-1).

At the end of the message, the calling party transmits the remote tone signal again over the telephone line, and this tone signal is again applied to port P2-7 of microcomputer 100. When the microcomputer recognizes the remote control signal, it again sets port DB-3 low, and allows a 2-second beep tone to be recorded on the announcement tape (T-1) and to be transmitted over the telephone line. At the termination of the beep tone, port DB-0 is made high (1), causing switch Z104D to be turned off. Port P2-1 is set low (0), causing the T-1 forward solenoid to drop out and allowing the T-1 head plate to pull back in, stopping the announcement tape (T-1). Port P2-0 is then set high (1), energizing the T-1 rewind solenoid and activating the rewind mechanism for the announcement tape (T-1) thereby causing the announcement tape (T-1) to rewind to its beginning position.

When a message is to be recorded at a particular position on the announcement tape (T-1) by a calling party from a remote location, a series of tone signals are transmitted over the telephone line in a particular code. These tone signals are fed to port P2-7 of the microcomputer. The coded tone signals are then compared with a diode matrix code created by the removal or insertion of diodes D301 through D304, and if the coded tone signals match the code, the microcomputer sets port P2-1 high (1), activating the forward control of the announcement tape (T-1). The announcement tape then moves forward to a predetermined position, as determined by the particular code of the received coded tone signals. At the same time, the oscillator of transistor Q101 transmits a steady beep tone to the calling party which continues for approximately 1 second. At the termination of the beep tone, the announcement tape (T-1) moves forward, and the calling party may record the particular message at the selected position on the announcement tape (T-1), through the same circuitry as was used for recording the new announcement, described above.

When the calling party completes the message, he again transmits the particular coded remote tone signals over the telephone line, which the microcomputer recognizes and again sets port DB-3 low, and causes a 2-second beep tone to be recorded on the announcement tape (T-1) and to be transmitted over the telephone line. At the termination of the beep tone, the system then returns to its normal stand-by condition, awaiting the next telephone call.

By transmitting different coded tones over the telephone line, the calling party may record different messages at different positions on the announcement tape (T-1).

As mentioned above, each of the individuals to which the various messages are to be forwarded is provided with his own particular code. When any one of the individuals sends his code over the telephone line in the form of coded tone signals, the microcomputer responds to the signals to set the announcement tape (T-1) to the position corresponding to the particular tone, so that the message recorded at that position may be transmitted to the calling party.

It will be appreciated that while a particular embodiment of the invention has been illustrated and described, modifications may be made. It is intended in the claims to cover all embodiments which fall within the spirit and scope of the invention.

What is claimed is:

1. In a telephone answering system which responds to telephone messages received over a telephone line and which includes a first mechanism including a first magnetic tape (T-1) having a recorded announcement thereon at a first predetermined position to be transmitted over the telephone line to a caller during an announcement mode ($T_1$) in response to a telephone call, and a second mechanism including a second magnetic tape (T-2) for recording messages received over the telephone line during a message recording mode ($T_2$) following the announcement mode ($T_1$), and which responds to a remote control tone signal received over the telephone line from a caller to effectuate predetermined control operations; the combination a microcomputer; circuit means adapted to be coupled to the telephone line for receiving the remote tone signal transmitted over the telephone line and for introducing the remote tone signal to the microcomputer; an input circuit adapted to be coupled to the telephone line for receiving audio signals therefrom representing a message from a caller and for recording the audio signals in a particular track on the first magnetic tape at the first predetermined position thereon; an output circuit adapted to be coupled to the telephone line for transmitting to a caller audio signals representing messages recorded on the particular track of the first magnetic tape; a first circuit connecting the microcomputer to the first magnetic tape mechanism (T-1) to cause the first magnetic tape to move in a forward direction; said microcomputer responding to the remote tone signal from a caller received over the telephone line to cause the first circuit to move the first magnetic tape to a second predetermined position displaced along said track from said first predetermined position, and said microcomputer causing said input circuit to be coupled to the telephone line to enable a message from the calling party to be recorded sequentially on the same track of said first magnetic tape at the second predetermined position.

2. The combination defined in claim 1, and which includes a coding circuit connected to said microcomputer, and in which said microcomputer responds to said remote tone signal from the caller received over the telephone line, only when the remote tone signal is coded in accordance with a code corresponding to a code established by said coding circuit, to cause said first circuit to move said first magnetic tape mechanism (T-1) to said second predetermined position of said first magnetic tape to enable the message from the calling party to be recorded on the first magnetic tape at the second predetermined position.

3. The combination defined in claim 1, in which said microcomputer responds to a remote tone signal from a caller received over the telephone line to cause the first circuit to move the first magnetic tape mechanism (T-1) to said second predetermined position of said first magnetic tape, and for causing said output circuit to be coupled to said telephone line to enable the message recorded at said second predetermined position to be transmitted over the telephone line to the calling party.

4. The combination defined in claim 3, and which includes a coding circuit connected to the microcomputer, and in which said microcomputer responds to the remote control signal only when the remote control signal is coded in accordance with a code established by said coding circuit.

5. The combination defined in claim 1, in which said microcomputer responds to a plurality of remote tone signals received over the telephone line to record a plurality of different messages at a corresponding plurality of predetermined sequential positions along said track on the first magnetic tape displaced from the first predetermined position at which the announcement is recorded.

6. The combination defined in claim 5, and which includes a coding circuit connected to the microcomputer, and in which the microcomputer responds to the plurality of remote control signals received over the telephone line only when the remote tone signals are coded in accordance with particular codes established by said coding circuit.

7. The combination defined in claim 6, in which said microcomputer responds to a plurality of remote tone signals received over the telephone line to cause the different messages recorded sequentially at the predetermined positions along said track on said first magnetic tape to be transmitted over the telephone line.

8. The combination defined in claim 7, in which said microcomputer responds to said remote signals only when said signals are coded in accordance with predetermined codes established by said coding circuit.

9. The combination defined in claim 7, and which includes a beep tone generator, and in which said microcomputer is connected to said beep tone generator to cause a beep tone from said beep tone generator to be recorded along said track on said first tape between each message sequentially recorded along said track on said first magnetic tape at said predetermined positions along said track.

* * * * *